United States Patent
Simard et al.

(10) Patent No.: US 11,460,372 B2
(45) Date of Patent: Oct. 4, 2022

(54) CHARACTERIZING INTEGRATED PHOTONICS DEVICES

(71) Applicant: Ciena Corporation, Hanover, MD (US)

(72) Inventors: Alexandre D. Simard, Quebec (CA); Michel Poulin, Quebec (CA); Christine Latrasse, Quebec (CA)

(73) Assignee: Ciena Corporation, Hanover, MD (US)

( * ) Notice: Subject to any disclaimer, the term of this patent is extended or adjusted under 35 U.S.C. 154(b) by 155 days.

(21) Appl. No.: 17/011,401

(22) Filed: Sep. 3, 2020

(65) Prior Publication Data

US 2022/0065743 A1 Mar. 3, 2022

(51) Int. Cl.
*G01M 11/00* (2006.01)
*G02B 6/122* (2006.01)
*G02B 6/12* (2006.01)

(52) U.S. Cl.
CPC ............ *G01M 11/31* (2013.01); *G01M 11/33* (2013.01); *G02B 6/122* (2013.01); *G02B 6/12004* (2013.01)

(58) Field of Classification Search
CPC ... G01M 11/31; G01M 11/33; G02B 6/12004; G02B 6/122
See application file for complete search history.

(56) References Cited

U.S. PATENT DOCUMENTS

| | | | | |
|---|---|---|---|---|
| 8,788,002 | B2 * | 7/2014 | LeBoeuf | A61B 5/1459 600/310 |
| 8,953,942 | B1 * | 2/2015 | Lam | H04J 14/0256 398/68 |
| 9,762,334 | B2 * | 9/2017 | Chang | G02B 6/125 |
| 9,778,493 | B1 * | 10/2017 | Krishnamoorthy | H01S 5/142 |
| 11,049,851 | B2 * | 6/2021 | Hon | G02B 6/0006 |
| 2004/0228564 | A1 * | 11/2004 | Gunn, III | G02B 6/12004 385/1 |
| 2005/0053383 | A1 * | 3/2005 | West | G02B 6/12004 398/153 |
| 2013/0223841 | A1 * | 8/2013 | Lee | H04J 14/0227 398/72 |
| 2015/0108336 | A1 * | 4/2015 | Dong | G01J 1/0425 250/227.28 |
| 2017/0031113 | A1 * | 2/2017 | Chen | G02B 6/12004 |
| 2017/0104109 | A1 * | 4/2017 | Simoyama | H01L 31/028 |
| 2018/0226767 | A1 * | 8/2018 | Takabayashi | G01J 1/4257 |
| 2019/0280461 | A1 * | 9/2019 | Menezo | H01S 5/1032 |
| 2021/0018814 | A1 * | 1/2021 | Gowda | G02B 5/20 |
| 2021/0126421 | A1 * | 4/2021 | Tanaka | H01S 5/4062 |
| 2021/0159659 | A1 * | 5/2021 | Bandyopadhyay | H01S 3/0078 |
| 2021/0384695 | A1 * | 12/2021 | Puckett | H01S 3/30 |
| 2021/0391903 | A1 * | 12/2021 | Jam | H04W 72/046 |

\* cited by examiner

*Primary Examiner* — Mohamed K Amara
(74) *Attorney, Agent, or Firm* — Young Basile Hanlon & MacFarlane, P.C.

(57) ABSTRACT

An integrated circuit comprises: at least one photonic layer that includes one or more optical waveguides; a first optical coupler that couples at least a first optical mode outside of the photonic layer to a first waveguide in the photonic layer; a photonic device that includes one or more ports in the photonic layer; a first multi-port optical coupler that includes three or more ports in the photonic layer, including a first port optically coupled to the first optical coupler, a second port optically coupled to a first port of the photonic device, and a third port optically coupled to a first optical reflector configured to send substantially all optical power emitted from the third port of the first multi-port optical coupler back to the third port of the first multi-port optical coupler.

16 Claims, 12 Drawing Sheets

CHARACTERIZING INTEGRATED PHOTONICS DEVICES

TECHNICAL FIELD

This disclosure relates to characterizing integrated photonics devices.

BACKGROUND

Photonic integrated circuits (PICs) often include a variety of photonic devices and optical waveguides for transporting optical waves around into and out of such devices (e.g., splitters, modulators, interferometers, resonators, multi-mode interference (MMI) couplers, photodetectors, etc.). A waveguide is a structure that confines and guides the propagation of an electromagnetic wave. Some electromagnetic waves have a spectrum that has a peak wavelength that falls in a particular range of optical wavelengths (e.g., between about 100 nm to about 1 mm, or some subrange thereof), also referred to as "optical waves," "light waves," or simply "light," and waveguides for light will be referred to herein as "optical waveguides". These optical waveguides may be implemented, for example, by forming a core structure from a material having a higher refractive index (e.g., silicon, or silicon nitride) surrounded by a cladding (also called a "buffer") comprising one or more materials (or air) that have a lower refractive index. For example, the core structure may be formed by the silicon layer over a buried oxide (BOX) layer (e.g., silicon dioxide) of a substrate, such as a silicon-on-insulator (SOI) wafer, while the cladding would be formed by the oxide of the BOX layer and the silicon dioxide deposited on top of the core structure. The cladding may in some cases be formed by a single lower-index material (or air), or by multiple different lower-index materials (or air). In some cases, there may be losses associated with coupling light into or out of optical waveguides within a PIC, and such losses may limit the ability to accurately characterize photonic devices in the PIC.

SUMMARY

In one aspect, in general, an integrated circuit comprises: at least one photonic layer that includes one or more optical waveguides; a first optical coupler that couples at least a first optical mode outside of the photonic layer to a first waveguide in the photonic layer; a photonic device that includes one or more ports in the photonic layer; a first multi-port optical coupler that includes three or more ports in the photonic layer, including a first port optically coupled to the first optical coupler, a second port optically coupled to a first port of the photonic device, and a third port optically coupled to a first optical reflector configured to send substantially all optical power emitted from the third port of the first multi-port optical coupler back to the third port of the first multi-port optical coupler.

Aspects can include one or more of the following features.

The integrated circuit further comprises: a second optical coupler that couples at least a second optical mode outside of the photonic layer to a second waveguide in the photonic layer; and a second multi-port optical coupler that includes three or more ports in the photonic layer, including a first port optically coupled to the second optical coupler, a second port optically coupled to a second port of the photonic device, and a third port optically coupled to a second optical reflector configured to send substantially all optical power emitted from the third port of the second multi-port optical coupler back to the third port of the second multi-port optical coupler.

The photonic device includes the first port, the second port, a third port that provides an alternative path for input received at the first port, and a fourth port that provides an alternative path for output emitted from the second port.

The integrated circuit further comprises: a third optical coupler that couples a third optical mode outside of the photonic layer to a third waveguide in the photonic layer; and a third multi-port optical coupler that includes three or more ports in the photonic layer, including a first port optically coupled to the third optical coupler, a second port optically coupled to a third port of the photonic device, and a third port optically coupled to a third optical reflector configured to send substantially all optical power emitted from the third port of the third multi-port optical coupler back to the third port of the third multi-port optical coupler.

The integrated circuit further comprises: a second optical coupler that couples a second optical mode outside of the photonic layer to a second waveguide in the photonic layer; a third optical coupler that couples a third optical mode outside of the photonic layer to a third waveguide in the photonic layer; a second multi-port optical coupler that includes three or more ports in the photonic layer, including a first port optically coupled to the second optical coupler, a second port isolated from the photonic device, and a third port optically coupled to a second optical reflector configured to send substantially all optical power emitted from the third port of the second multi-port optical coupler back to the third port of the second multi-port optical coupler; and a third multi-port optical coupler that includes three or more ports in the photonic layer, including a first port optically coupled to the third optical coupler, a second port optically isolated from the photonic device and coupled to the second port of the second multi-port optical coupler, and a third port optically coupled to a third optical reflector configured to send substantially all optical power emitted from the third port of the third multi-port optical coupler back to the third port of the third multi-port optical coupler.

The photonic device comprises an electro-optical component that includes at least one optical input or output port and at least one electrical input or output port.

The electro-optical component comprises a photodiode.

The first optical coupler comprises a grating coupler or an edge coupler.

The photonic layer includes one or more optical delay lines configured to provide different propagation delays: (1) between the first multi-port optical coupler and the first optical reflector, and (2) between the first multi-port optical coupler and the photonic device.

The first optical reflector comprises a Sagnac loop reflector.

The photonic layer includes one or more variable optical attenuators configured to provide control of optical power propagating within different portions of the photonic layer.

The integrated circuit further comprises: a second optical coupler that couples a second optical mode outside of the photonic layer to a second waveguide in the photonic layer that is optically coupled to the first port of the photonic device and optically coupled to the second port of the first multi-port optical coupler; and a third optical coupler that couples a third optical mode outside of the photonic layer to a third waveguide in the photonic layer that is optically coupled to a second port of the photonic device and optically coupled to the second port of the first multi-port optical coupler; wherein the second port of the first multi-port optical coupler is optically coupled to the first port of the photonic device by receiving a portion of an optical wave that is received by the second optical coupler and at least partially transmitted to the first port of the photonic device.

In another aspect, in general, a method for characterizing a photonic device in a photonic layer of an integrated circuit comprises: coupling an optical wave into a first optical coupler in the photonic layer; providing an output signal from the photonic device in response to the photonic device receiving a first portion of the optical wave; providing a second portion of the optical wave from the first optical coupler, wherein the second portion of the optical wave was not coupled into the photonic device; and characterizing at least one of an optical transmission characteristic or an optical reflection characteristic of the photonic device based at least in part on the second portion of the optical wave and the output signal.

Aspects can include one or more of the following features.

The output signal comprises at least one of an optical wave, a current, or a voltage.

The characterizing includes performing time filtering to distinguish the second portion of the optical wave and the output signal based at least in part on one or more optical delay lines in the photonic layer.

At least one of providing the output signal or providing the second portion of the optical wave is performed while attenuating at least one optical wave in a waveguide in the photonic layer.

The characterizing includes subtracting a value based on the second portion of the optical wave from a value based on the output signal.

The output signal from the photonic device comprises an optical wave from the photonic device, and the characterizing is based at least in part on a first output optical wave coupled out of a second optical coupler in the photonic layer in a first time period including a portion of the optical wave from the photonic device, and a second output optical wave coupled out of the second optical coupler in a second time period including a portion of the second portion of the optical wave.

In another aspect, in general, an integrated circuit comprises: at least one photonic layer that includes one or more optical waveguides; a first grating coupler that couples at least a first optical mode outside of the photonic layer to a first waveguide in the photonic layer; a photonic device that includes one or more ports in the photonic layer; a first optical splitter that includes three or more ports in the photonic layer, including a first port optically coupled to the first grating coupler, a second port optically coupled to a first port of the photonic device, and a third port optically coupled to a first Sagnac loop reflector.

The integrated circuit can include: a second grating coupler that couples at least a second optical mode outside of the photonic layer to a second waveguide in the photonic layer; a third grating coupler that couples a third optical mode outside of the photonic layer to a third waveguide in the photonic layer; a second optical splitter that includes three or more ports in the photonic layer, including a first port optically coupled to the second grating coupler, a second port isolated from the photonic device, and a third port optically coupled to a second Sagnac loop reflector; and a third optical splitter that includes three or more ports in the photonic layer, including a first port optically coupled to the third grating coupler, a second port optically isolated from the photonic device and coupled to the second port of the second optical splitter, and a third port optically coupled to a third Sagnac loop reflector.

Aspects can have one or more of the following advantages.

The techniques described herein can be used to determine optical characteristics of photonic devices such as the insertion loss of on-chip optical circuits and components in one or more layers of a PIC, also called a device-under-test (DUT). In silicon photonics (SiP), one type of optical coupler used for wafer-level-testing is a surface grating coupler. But, grating couplers often include sub-micrometer features, and variation of the precise dimensions of those features during fabrication can lead to relatively large variability in their spectral response (e.g., a coupling efficiency response as a function of wavelength). This variability can significantly increase the uncertainty of measurements of characteristics of a DUT using light that has been provided using such a grating coupler, such as insertion loss of the DUT. The techniques described herein are able to substantially remove the variability of the optical coupler spectral response from the DUT measurement. For example, the reflection measurements enabled by the optical reflectors used in some examples described herein can be used to cancel the effects of the optical couplers from the DUT measurements. Other advantages include improving the robustness of the characterization to multi-path interference (MPI), and enabling the characterization of a reflection and phase response of a DUT.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
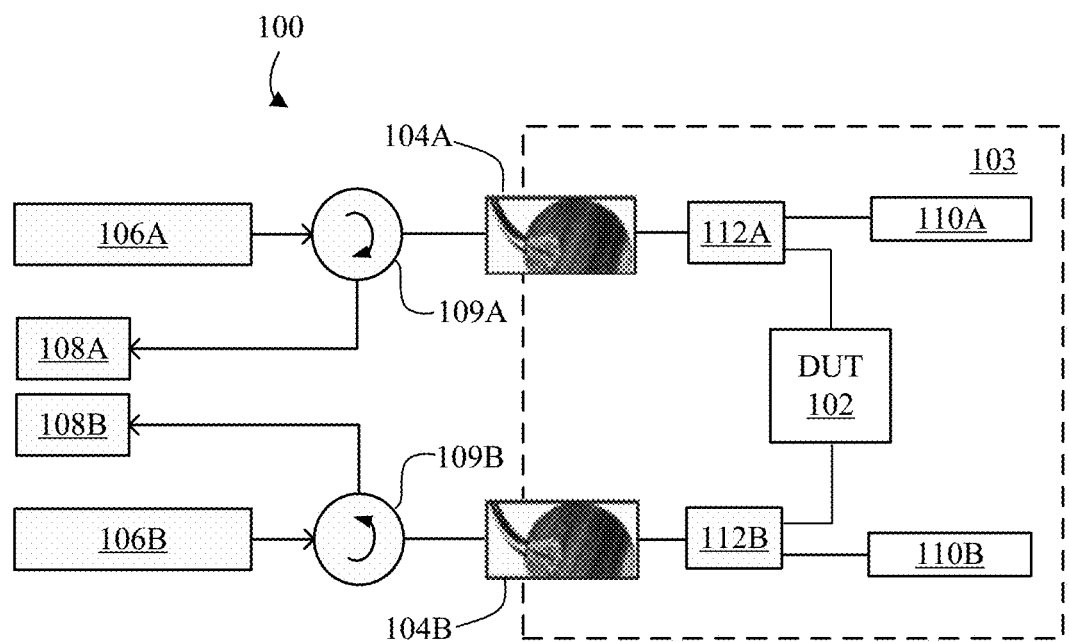
FIGS. 1A and 1B are schematic diagrams of an example device circuit and corresponding calibration circuit, respectively.

For measurements of optical characteristics (e.g., insertion loss) of a DUT in a PIC, light for making the measurement typically comes from an optical fiber located near the top surface of the PIC. One type of optical coupler used to couple light from an optical fiber into the DUT, and from the DUT into an optical fiber, is a grating coupler (GC). The DUTs being tested can be within PICs that are formed in each cell on a wafer (e.g., a silicon wafer for a SiP device) for wafer-level-testing (WLT). For example, a WLT station can be used to perform many measurements of many DUTs on each cell on the wafer in a short amount of time. Each cell, which will be used to form a respective die after the wafer is diced, can include one or more DUTs distributed over different locations on the die that represent a copy of each type of photonic device used in a product photonic circuit on the die. For example, in a single cell area there may be 30 devices fabricated as a DUT to be tested for characterizing different types of photonic devices used in product photonic circuit(s) on the cell. This cell is reproduced, by step lithography for example, over the whole wafer area, so that one particular DUT appears across multiple locations on the wafer. This step process is a potential source of fabrication variability in the GC response. Other sources of fabrication variability can include position-dependent etching rates, etching anisotropy, etc. A given cell pattern can be repeated over the whole wafer. A cell can contain many circuits, components, etc. A die is formed by dicing (also called singulating) all or part of each cell. So, a single cell can provide one or more dies.

One way to remove the variability due to the responses of the GCs from the measurement of a "device circuit" with a DUT is to fabricate a separate "calibration circuit" adjacent to (or in proximity to) the device circuit that includes the GCs but does not include the DUT. For example, the components in the calibration circuit are isolated from the DUT (e.g., either by providing a calibration circuit that is a copy of the device circuit with the DUT removed, or by providing a calibration circuit with a "disconnected" DUT without any waveguides connecting any of the ports of the components in the calibration circuit to the DUT), as shown in more detail in the examples herein. However, even when generalized DUT characteristics are determined based on an average of an ensemble of measurements of many device circuit and calibration circuit pairs, for an individual DUT characterization, there may be a relatively large uncertainty due to the variability between the GCs in the device circuit and the calibration circuit. As a result, precise characterization of individual on-chip components, which may be required for design validation for example, may be challenging. As an example of an unfortunate consequence of such uncertainty in individual DUT characterization, a die selected to be good after wafer-level testing may finally be rejected after being diced and packaged, reducing yield and increasing the product fabrication costs. Device circuits for characterizing DUTs as described herein are configured to include features that enable test measurements to be performed that at least partially compensate for this potential uncertainty. A corresponding calibration circuit is not necessary for this compensation in the device circuit to be effective, but can still optionally be used in some implementations, as described in more detail below.

Referring to FIG. 1A, an example of a device circuit 100 includes a DUT 102 to be characterized on a portion 103 of a chip, an optical coupler 104A for coupling input light from an off-chip optical source 106A (e.g., a laser), and an optical coupler 104B for coupling output light to an off-chip detector 108B (e.g., a photodiode detection circuit). The examples illustrated in many of the figures will include surface grating couplers as the optical couplers, but in other examples, the optical couplers could be implemented using different photonic circuit elements such as an edge coupler that arranges an end of a waveguide to extend to the edge of the chip for alignment with another waveguide on a different chip, or for alignment with a core of an optical fiber that is butt coupled, for example. Some optical couplers could involve the use of one or more of: spot size converters, lensed-fibers, freebeam coupling using lenses, prism couplers, or other couplers or coupling mechanisms.

In this example, the DUT 102 has two ports, with a first port that may be configured for receiving an optical wave as input and a second port that may be configured for providing an optical wave as output with respect to transmission in a particular direction designated as "forward propagation" through the DUT. In some cases, it is useful to also characterize transmission in the opposite direction with respect to "reverse propagation" through the DUT. For example, a given DUT may be designed to allow bidirectional transmission through its ports (e.g., a reciprocal photonic device), or may be designed to provide different behavior for transmission through its ports in opposite directions (e.g., a non-reciprocal photonic device). Also, in other examples, a DUT with more than a single input port and/or a single output port can be characterized using these techniques, as described in more detail below.

In this example, the device circuit 100 also includes off-chip optical circulators 109A and 109B to enable light to be coupled to and from the DUT 102 in the forward propagation direction described above and to and from the DUT 102 in the reverse propagation direction as follows. Using other ports of the off-chip optical circulators 109A and 109B, the device circuit 100 also uses the optical coupler 104B for coupling input light from an off-chip optical source 106B (e.g., a laser), and uses the optical coupler 104A for coupling output light to an off-chip detector 108A (e.g., a photodiode detection circuit). In other examples, instead of using separate optical sources 106A and 106B and separate detectors 108A and 108B for the different directions, a single optical source and/or a single detector can be shared using a switch or other optical routing device(s) to change the optical coupler 104A or 104B to which the optical source or detector is connected while a given measurement is being performed.

The device circuit 100 also includes optical reflectors 110A and 110B that are arranged within the device circuit 100 using multi-port optical couplers 112A and 112B to provide auxiliary signals that can be used to compensate for the variability in the spectral response of each of the optical couplers 104A and 104B. In this example, the multi-port optical couplers 112A and 112B are 1×2 optical splitters with an even 50/50 splitting ratio, but other types of couplers that include at least one input port and at least two output ports could be used, and the splitting ratio could be different in other examples. As used herein, an optical reflector includes any on-chip circuit element that is capable of sending back substantially all of the optical power emitted from a location in the circuit back to that location. One example of an optical reflector that works well in a photonic integrated circuit is a Sagnac loop reflector (or simply "Sagnac reflector"), as described in more detail below. The examples referenced in many of the figures will include Sagnac reflectors as the optical reflectors, but in other examples, the optical reflectors could be implemented using different circuit elements (e.g., Bragg reflectors).

In this example, when the light is coupled into the optical coupler 104A, half of the optical power is sent towards the DUT 102 using one output port of the multi-port optical coupler 112A. The light emitted from the other output port of the multi-port optical coupler 112A is sent into the optical reflector 110A, which reflects substantially all of the optical power back to the multi-port optical coupler 112A. By energy conservation, given the 50/50 splitting ratio of the 1×2 optical splitter used as the multi-port optical coupler 112A, about half of that reflected optical power is emitted back out of the input port of the multi-port optical coupler 112A towards the optical coupler 104A. The optical circulator 109A sends this reflected auxiliary signal to the detector 108A to provide a detected signal that will be used to remove the spectral responses of the optical couplers 104A and 104B from the DUT measurements.

Figure 1B:
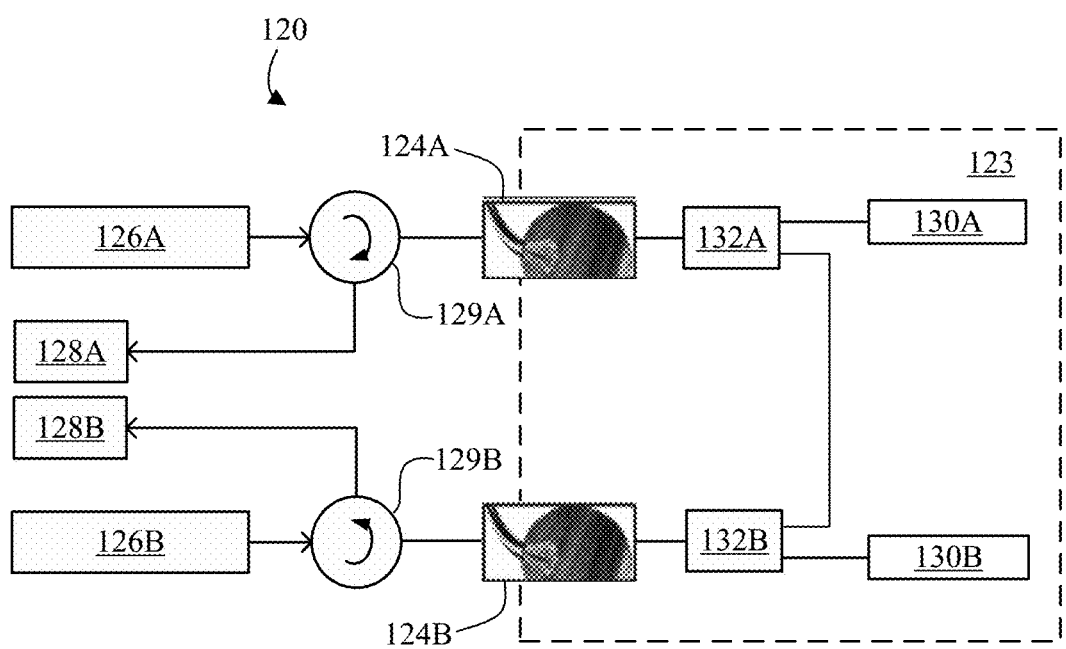

A corresponding calibration circuit 120 is shown in FIG. 1B. Such a calibration circuit 120 is useful to characterize the on-chip circuit elements other than the DUT 102 (e.g., losses due to reflectors, splitters, waveguides, or other circuit elements that may be used in other implementations). The calibration circuit 120 is fabricated on a portion 123 in proximity to the portion 103 of the same chip. The calibration circuit 120 includes an optical coupler 124A for coupling input light from an off-chip optical source 126A (e.g., a laser), and an optical coupler 124B for coupling output light to an off-chip detector 128B (e.g., a photodiode detection circuit). The calibration circuit 120 also includes off-chip optical circulators 129A and 129B to enable measurement in the reverse propagation direction. So, the calibration circuit 120 also uses the optical coupler 124B for coupling input light from an off-chip optical source 126B (e.g., a laser), and uses the optical coupler 124A for coupling output light to an off-chip detector 128A (e.g., a photodiode detection circuit). As in the device circuit 100, when the light is coupled into the optical coupler 124A, half of the optical power is sent towards a waveguide section omitting a DUT using one output port of a multi-port optical coupler 132A. The light emitted from the other output port of the multi-port optical coupler 132A is sent into the optical reflector 130A, which reflects substantially all of the optical power back to the multi-port optical coupler 132A. Again, by energy conservation, about half of that reflected optical power is emitted back out of the input port of the multi-port optical coupler 132A towards the optical coupler 124A. The optical circulator 129A sends this reflected auxiliary signal to the detector 128A to provide a detected signal that will be used to remove the spectral responses of the optical couplers 124A and 124B from the calibration measurements.

Various alternative implementations can be used for the device circuit 100 and the calibration circuit 120. In some implementations, the same changes are made in both circuits to preserve the correspondence between the circuits. For example, if 1×2 optical splitters with an asymmetric splitting ratio other than 50/50 is used for the multi-port optical couplers 112A and 112B, then a 1×2 optical splitter with the same asymmetric splitting ratio is also used for the multi-port optical couplers 132A and 132B. In some implementations, a first splitting ratio could be used for the couplers 112A and 132A, and another splitting ratio could be used for the couplers 112B and 132B. But, two different calibration circuits would be used, with one calibration circuit having identical 1×2 optical splitters with the first splitting ratio, and another separate calibration circuit having identical 1×2 optical splitters with the second splitting ratio. A common splitting ratio used for all four couplers 112A, 112B, 132A, and 132B is useful for some measurements, such as measurements for characterizing both transmission through and reflection from a DUT. Also, as mentioned above for the device circuit 100, alternative implementations of the calibration circuit 120 can be modified to use a single optical source and/or a single detector that is shared using a switch or other optical routing device(s) to change the optical coupler to which the optical source or detector is connected while a given measurement is being performed.

Even without the use of the calibration circuit 120, the effects of the spectral responses of the optical couplers 104A and 104B can be removed from the measurements of the spectral response of the DUT 100 using the reflection measurements due to the optical reflectors 110A and 110B. Without the effects of the optical couplers 104A and 104B, the measurement uncertainty becomes dominated by the effects of the multi-port optical couplers 112A and 112B. But, the fabrication variability of multi-port optical couplers such as 1×2 optical splitters is much smaller than the fabrication variability of fiber-to-chip optical couplers such as grating couplers, for example, due to the larger tolerance to fabrication errors, and due to the fact that the spectral response of an on-chip 1×2 optical splitter does not depend on the physical positioning of an optical fiber.

In some implementations, the optical couplers 104A and 104B used in the device circuit 100 are not identical. For example, the optical coupler 104A can be a grating coupler that is configured to couple light to or from a transverse electric (TE) mode and the optical coupler 104B can be a grating coupler that is configured to coupled can be designed to couple light to or from a transfers magnetic (TM) mode. Such a configuration can be used, for example to characterize polarization crosstalk in a DUT, which quantifies how much an input configured for a TE mode leaks into an output configured for a TM mode.

Figure 2A:
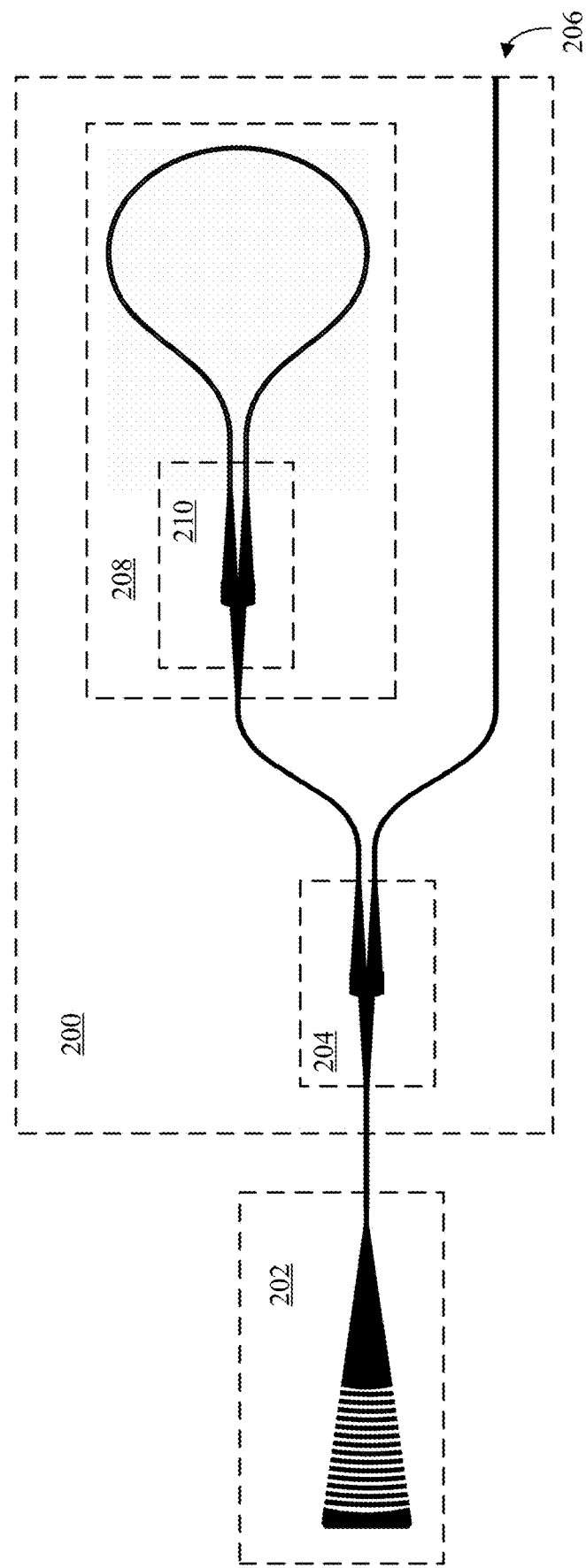
FIG. 2A is a schematic diagram of an example coupling interface.
Figure 2B:
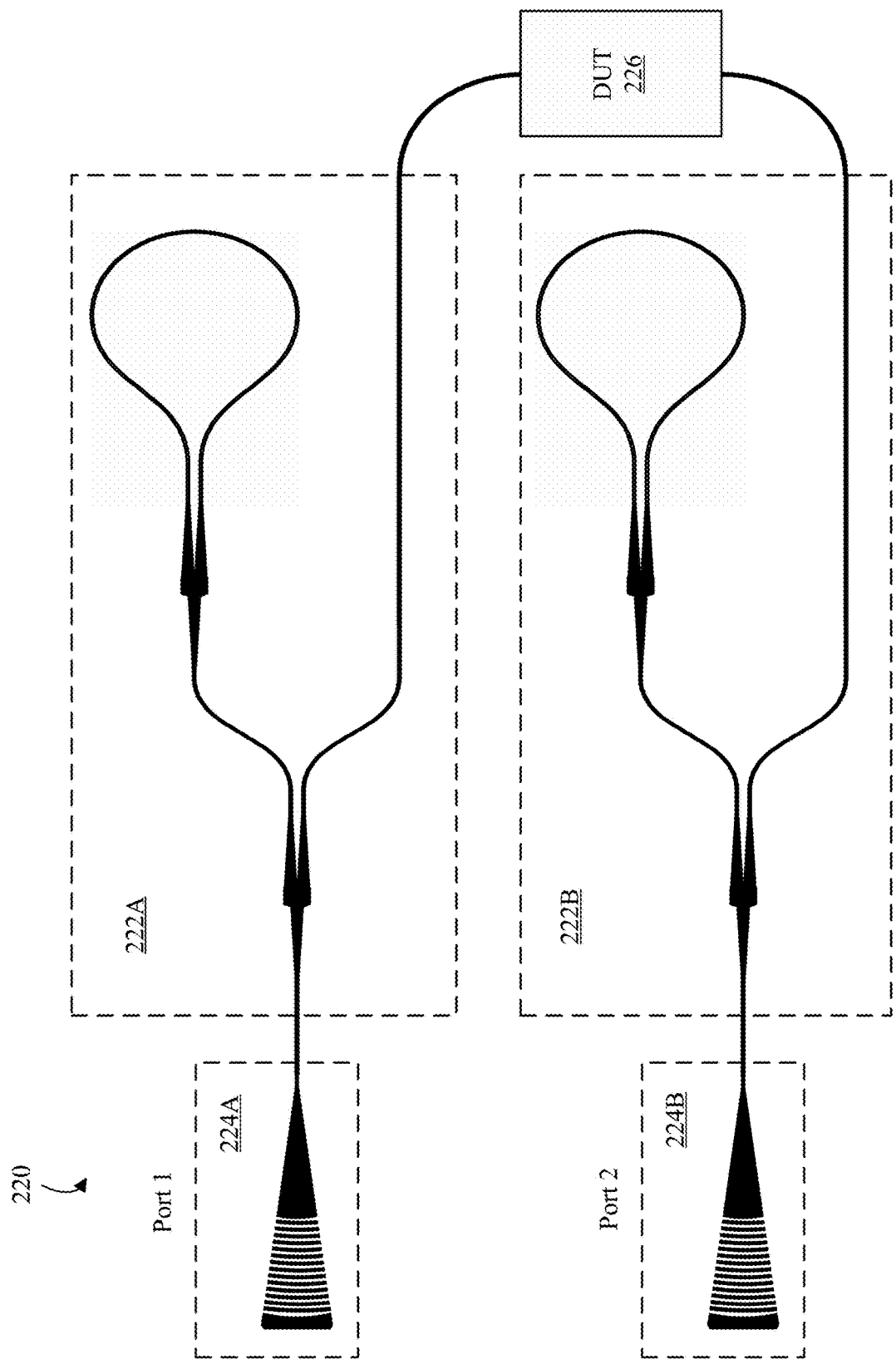
FIG. 2B is a schematic diagram of an example device circuit.

For a DUT with any number of input and/or output ports, FIG. 2A shows a particular example of a testing interface 200 that can be used between a grating coupler 202 and the DUT (not shown) to couple an optical input fiber or output fiber to an input or output port of the DUT, respectively, via the grating coupler 202. In this example, the multi-port optical coupler used to split off some light for reflection is a 1×2 optical splitter 204 that provides one path from the grating coupler 202 to an interface port 206, and another path from the grating coupler 202 to a Sagnac reflector 208. The Sagnac reflector 208 splits light received at an input port of an internal 1×2 optical splitter 210 both ways around a looped waveguide forming a closed path between the two output ports of the 1×2 optical splitter 210. FIG. 2B shows an example of a device circuit 220 formed from two such testing interfaces. One testing interface 222A is coupled to a grating coupler 224A, and another testing interface 222B is coupled to a grating coupler 224B, on either side of a 2-port DUT 226.

The large variability associated with the grating coupler 202 is partly due to the small (e.g., nanometer size) structures used to form the curved grating teeth. For example, in some implementations, the teeth have a half-period of about 300 nm and their height is in the range of around 50 to 120 nm. A slight variation of these structural dimensions can significantly modify the optical effective index, which changes the optimal diffraction angle between the waveguide mode and the optical fiber mode, and the coupling efficiency between the two modes. A variation of these structural dimensions can also significantly modify the optical group index, which is directly related to the 3-dB bandwidth of the spectral response of the grating coupler 202. The duty-cycle (DC) of the teeth can also significantly influence the optical mode associated with the grating structure, and therefore influences the optical effective and group indexes. In some cases, variations in one or more of these structural dimensions can result from relatively small overetching or under-etching and photoresist non-uniformity across the wafer during fabrication, which affect the DC and the height of the teeth. The variation of the initial silicon thickness can also have a significant impact on the mode index. Any of these fabrication non-uniformities may vary throughout a wafer, which can contribute to the high variability of the spectral response of grating couplers across the wafer.

Another source of variability of the measurement of the spectral response of light being coupled between an optical fiber and a grating coupler comes from the position and/or angle of the optical fiber. If the position and/or angle of the optical fiber are different from one grating coupler to another, the amount of light that is successfully coupled (instead of lost) will generally be different. The shape of the spectral response (i.e., variation over wavelength) will generally be different as well. The dependency on the position of the fiber also makes on-chip coupling potentially less reliable.

An example of a potential impact of the relatively large variability associated with a grating coupler when attempting to characterize a DUT such as a 1×2 optical splitter is uncertainty in measuring the splitting ratio. For example, for a 1×2 optical splitter with a nominal 50/50 splitting ratio, a measurement uncertainty of ±0.7 dB due to the grating coupler can result in an uncertainty in the splitting ratio measurement of ±8%. An uncertainty of this magnitude can have a drastic impact in establishing optical power budgets for complex SiP based devices. The large variability can also impact the ability to generate reliable S-parameter matrix models of individual components from experimental data, and thus impact the ability to properly simulate a cascade of components.

Using the DUT characterization techniques described herein, the contribution of a high variability optical coupler such as the grating couplers 224A and 224B in the device circuit 220, or in similar device circuits that use a testing interface such as the testing interface 200 for the optical coupler, can be rigorously removed from a measurement, reducing the uncertainty associated with characterizing the DUT 226. Instead, any remaining uncertainty may be associated with the (smaller) variability of other optical components in the device circuit.

Without intending to be bound by theory, example equations are presented below, which can be used to characterize transmission characteristics of a DUT based on measurements performed using a device circuit as shown in FIG. 2B. Using these equations, a transmission insertion loss for a 2-port DUT can be computed (e.g., using a computing system that is coupled to, or receives data from the off-chip detectors coupled to the circuit). Furthermore, by measuring the insertion loss at multiple different wavelengths (e.g., wavelengths across the C-band) an insertion loss spectrum can be computed. In the following equations, the wavelength dependence is not explicitly indicated for simplicity. Also, second or higher order terms related to parasitic reflections coming from the optical couplers and from the DUT are also omitted for simplicity, since their effect can be neglected without significantly affecting the results.

In this example, a linear coefficient $T_{lin}$ (between 0 and 1) can be defined to characterize either the transmission or reflection loss characteristics of a component (e.g., transmission between any two ports of an N-port component or reflection from any ports of an N-port component). To further simplify the calculations, these (unitless) linear coefficients will be converted into "insertion loss variables" L that indicate insertion loss in units of decibels (dB), with a insertion loss variable of 0 dB indicating no insertion loss, based on the following relationships between the linear coefficients and the insertion loss variables:

$$L = 10 \log(T_{lin})[\text{dB}]$$

Using such insertion loss variables defined in units of dB (rather than transmission through or reflection from a component in linear terms) enables the effect of a concatenation of individual optical components to be computed by summing insertion loss variables of each of the individual optical components (instead of multiplying their linear coefficients). Additionally, for convenience of notation, the following notation will be used. Referring again to FIG. 2B, DUT is the insertion loss variable for the device-under-test 226. $GC_1$ and $GC_2$ are insertion loss variables for the grating couplers 224A and 224B coupled to Port 1 and Port 2, respectively. $T_a^{1\times 2}$ and $T_b^{1\times 2}$ are the insertion loss variables for the 1×2 optical splitters 228A and 228B. The variables $S_a^{1\times 2}$, $S_b^{1\times 2}$, $(S_a^{1\times 2})'$, and $(S_b^{1\times 2})'$ are the splitting ratios of those 1×2 optical splitters. In particular, $S_a^{1\times 2}$ and $S_b^{1\times 2}$ are the splitting ratios of the ports of the 1×2 splitters going toward the DUT 226, and $(S_a^{1\times 2})'$ and $(S_b^{1\times 2})'$ are the splitting ratios for the complementary ports that go to the Sagnac reflectors 230A and 230B, respectively. For the splitters, $S_a^{1\times 2}+(S_a^{1\times 2})'=1$ and $S_b^{1\times 2}+(S_b^{1\times 2})'=1$. An ideal 1×2 splitter should have $T_{a,b}^{1\times 2}=0$ dB and $S_{a,b}^{1\times 2}=(S_{a,b}^{1\times 2})'=-3$ dB. $SR_1$ and $SR_2$ are the insertion loss variables representing the (potentially lossy) reflection from the Sagnac reflectors 230A and 230B, respectively.

The equations that represent the measurements used to characterize the DUT 226 using the example device circuit 220 are:

$$M_{12}[\text{dB}] = GC_1 + T_a^{1\times 2} + S_a^{1\times 2} + DUT + T_b^{1\times 2} + S_b^{1\times 2} + GC_2$$
$$= GC_1 + GC_2 + T_a^{1\times 2} + T_b^{1\times 2} + S_a^{1\times 2} + S_b^{1\times 2} + DUT$$

$$M_{11}[\text{dB}] = GC_1 + T_a^{1\times 2} + (S_a^{1\times 2})' + SR_1 + T_a^{1\times 2} + (S_a^{1\times 2})' + GC_1$$
$$= 2GC_1 + 2(S_a^{1\times 2})' + 2T_a^{1\times 2} + SR_1$$

$$M_{22}[\text{dB}] = GC_2 + T_b^{1\times 2} + (S_b^{1\times 2})' + SR_2 + T_b^{1\times 2} + (S_b^{1\times 2})' + GC_2$$
$$= 2GC_2 + 2(S_b^{1\times 2})' + 2T_b^{1\times 2} + SR_2$$

where $M_{ij}$ are the collective insertion loss measurements from port j to port i, which can be obtained through three separate measurements. $M_{21}$ does not need to be measured, since energy conservation leads to $M_{ij}=M_{ji}$. But, $M_{21}$ can be measured for validation or averaging out noise. The spectral response for the DUT 226 can be determined based on these insertion loss measurements as follows:

$$M_{12} - \frac{M_{11}}{2} - \frac{M_{22}}{2} = GC_1 + GC_2 + T_a^{1\times 2} + T_b^{1\times 2} + S_a^{1\times 2} + S_b^{1\times 2} + DUT -$$
$$\left(GC_1 + (S_a^{1\times 2})' + T_a^{1\times 2} + \frac{SR_1}{2}\right) - \left(GC_2 + (S_b^{1\times 2})' + T_b^{1\times 2} + \frac{SR_2}{2}\right)$$

After regrouping the similar terms, this can be expressed as the following device circuit equation:

$$M_{12} - \frac{M_{11}}{2} - \frac{M_{22}}{2} =$$

-continued $$DUT - \left(\frac{SR_1}{2} + \frac{SR_2}{2}\right) + \underbrace{\left(S_a^{1\times2} - \left(S_a^{1\times2}\right)'\right) + \left(S_b^{1\times2} - \left(S_b^{1\times2}\right)'\right)}_{1\times2 \text{ Splitter asymmetry}}$$
$$\underbrace{\phantom{\left(\frac{SR_1}{2} + \frac{SR_2}{2}\right)}}_{\text{Reflector loss}}$$

From this equation, it can be seen that this DUT characterization technique completely removes the GC spectral responses but leaves a term related to the insertion losses of the reflectors and a term related to the asymmetry between the ports of the two 1×2 splitters in the device circuit 220. This equation also shows that the imprecision of this technique for characterizing the DUT is related to the variability of the reflectors and splitters, which are components that are generally more robust to fabrication errors than structures such as grating couplers that involved sub-micrometer structures. Furthermore, the properties of those components do not depend on the position of the optical fiber, eliminating that source of variability. To the extent that these terms are negligible, no calibration circuit is needed. But, the effect of these terms can be mitigated or essentially removed by a calibration measurement from a corresponding calibration circuit in which the DUT is replaced by an essentially lossless waveguide.

An equation for a calibration circuit can be obtained from the equation above, but without a DUT (i.e., DUT=0 dB insertion loss) to yield:

$$M_{12,cal} - \frac{M_{11,cal}}{2} - \frac{M_{22,cal}}{2} =$$
$$-\underbrace{\left(\frac{SR_1}{2} + \frac{SR_2}{2}\right)}_{\text{Reflector loss}} + \underbrace{\left(S_a^{1\times2} - \left(S_a^{1\times2}\right)'\right) + \left(S_b^{1\times2} - \left(S_b^{1\times2}\right)'\right)}_{1\times2 \text{ Splitter asymmetry}}$$

The right hand side of this calibration circuit equation can be regrouped into two terms, each term being associated with the circuitry used to characterize one of the grating couplers (with grating couplers 224A and 224B labeled as GC1 and GC2, respectively):

$$M_{12,cal} - \frac{M_{11,cal}}{2} - \frac{M_{22,cal}}{2} =$$
$$\underbrace{\left(S_a^{1\times2} - \left(S_a^{1\times2}\right)' - \frac{SR_1}{2}\right)}_{\text{Circuit for GC1}} + \underbrace{\left(S_b^{1\times2} - \left(S_b^{1\times2}\right)' - \frac{SR_2}{2}\right)}_{\text{Circuit for GC2}}$$

Since this technique relies on the low variability of these photonic components to remove (or de-embed) the GC spectral responses from the overall spectral response, this assumption can be used to rewrite the calibration circuit equation as:

$$M_{12,cal} - \frac{M_{11,cal}}{2} - \frac{M_{22,cal}}{2} = \underbrace{2\left(S^{1\times2} - \left(S^{1\times2}\right)' - \frac{SR}{2}\right)}_{\Sigma = \text{calibration term}}$$

where $\Sigma$ is a generalized calibration term that is assumed to have a relatively low variability. Similarly, to characterize a 2-port DUT, the device circuit equation above can be rewritten as:

$$DUT = M_{12} - \frac{M_{11}}{2} - \frac{M_{22}}{2} - 2\Sigma$$

The device equation and calibration equation together can be used to determine the insertion loss of the DUT. The calibration term $\Sigma$ can be estimated using measurements from the calibration circuit, and then twice this calibration term can be subtracted from the results of the device circuit measurements to yield the insertion loss of the DUT. For other device circuit that use only a single grating coupler, as in the example of FIG. 3 below for a 2-port DUT with an optical input port and an electronic output port, a similar device equation can be written as follows:

$$DUT = M_{12} - \frac{M_{11}}{2} - \Sigma$$

The calibration term $\Sigma$ is not dependent on the alignment of the optical fiber or the position of the DUT on the wafer, assuming a good device reproducibility, but is only dependent upon the reflector's insertion loss and the splitting ratio asymmetry. If different types of splitter and/or reflector structures are used on a wafer, there can be a corresponding type of calibration circuit used to determine the value of a corresponding calibration term $\Sigma$.

In some cases, in addition to, or instead of, measuring insertion loss of a DUT, the reflection from a DUT can be measured. In that case, the delay between the reflection from the DUT and reflection from the reflectors in the testing interface should be large enough to ensure that both of these signals can be sufficiently separated in time to be measured independently (using appropriate instrumentation, such as an optical vector analyzer, for example).

The following equation can be used for calculating the reflection spectrum coming from the calibration circuit:

$$M_{11}[dB] = GC_1 + T_a^{1\times2} + \left(S_a^{1\times2}\right)' + SR_1 + T_a^{1\times2} + \left(S_a^{1\times2}\right)' + GC_1$$
$$= 2GC_1 + 2\left(S_a^{1\times2}\right)' + 2T_a^{1\times2} + SR_1$$

The reflection coming from the DUT from port 1 (DUT$_{11}$) path is given by:

$$M_{11,DUT}[dB] = GC_1 + T_a^{1\times2} + S_a^{1\times2} + DUT + S_a^{1\times2} + T_a^{1\times2} + GC_1$$
$$= 2GC_1 + 2S_a^{1\times2} + 2T_a^{1\times2} + DUT_{11}$$

To obtain the reflection spectral response of the DUT the following equation can be used:

$$M_{11,DUT} - M_{11} = DUT_{11} + 2\left(S_a^{1\times2} - \left(S_a^{1\times2}\right)' - \frac{SR_1}{2}\right)$$

Once again, the same generalized calibration term $\Sigma$ can be found in this equation. As a result, the reflection from the DUT can be obtained from:

$$DUT_{11} = M_{11,DUT} - M_{11} - 2\Sigma$$

Since the calibration term representing the reflector loss and splitter asymmetry can be removed using a calibration circuit, as shown, these DUT characterization techniques can be used with 1×2 splitters that do not split the light equally between their two output ports. As a result, any splitting ratio can be used if there is a calibration circuit to remove the "systematic error" added by the splitter asymmetry term. Thus, the splitter choice can be made to minimize its variability more than to maximize the splitting ratio evenness. In some cases, if the DUT to be characterized is significantly lossy, it could be advantageous to use a splitter with a splitting ratio that differs from relatively even 50/50 ratio (e.g., use a 90/10 splitting ratio with 90% of the light sent to the DUT and 10% sent to the reflector). In some implementations, the choice of splitting ratio can be based on increasing (e.g., maximizing) the signal-to-noise ratio for either or both the DUT insertion loss and/or reflection measurements.

Figure 3:
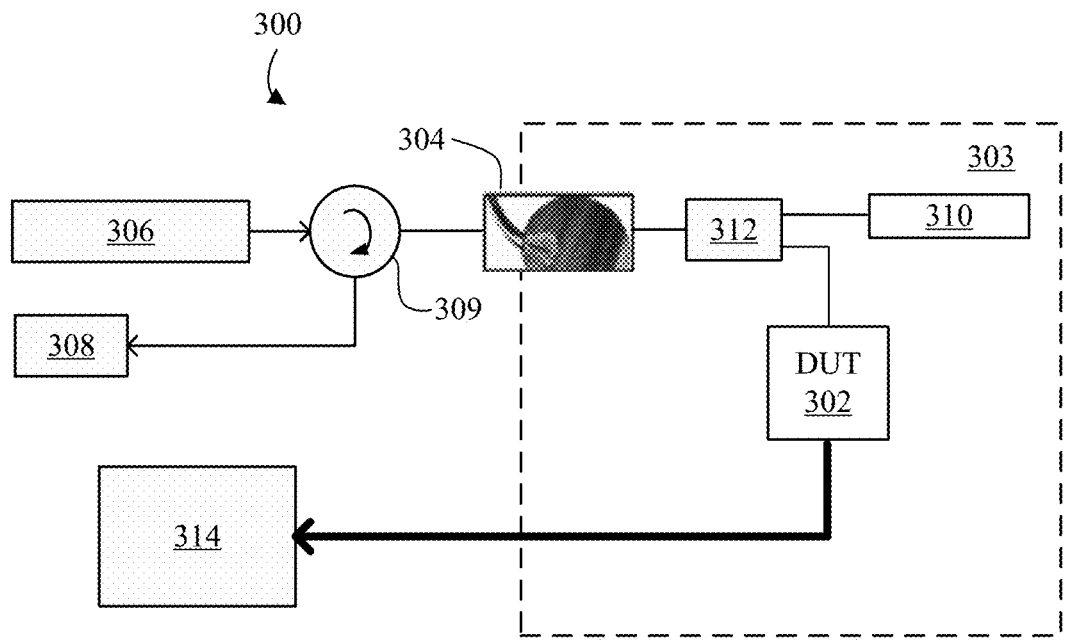
FIG. 3 is a schematic diagram of an example device circuit for a DUT with an electrical output port.

These DUT characterization techniques are applicable to the characterization of a variety of types of optical devices that may be included in a PIC. In some cases, for a purely optical DUT, the optical insertion loss is being characterized. Alternatively, these DUT characterization techniques can be used to characterize electro-optical components that include one or more electrical input or output ports. FIG. 3 shows an example device circuit 300 for an electro-optical DUT 302 that has an optical input port and an electrical output port, such as a photodiode. The DUT 302 is on a portion 303 of a chip that includes an optical coupler 304 for coupling input light from an off-chip optical source 306 (e.g., a laser), and an off-chip detector 308 (e.g., a photodiode detection circuit) that detects a reflection signal coupled back out through the optical coupler 304 and an off-chip optical circulator 309. There is also an optical reflector 310 and a multi-port optical coupler 312 for providing the reflection signal. In the case of a photodiode as the DUT 302, a bias voltage is applied to the photodiode and a current (e.g., a photocurrent) from the photodiode is measured using an appropriate off-chip detection circuit 314. Alternatively, a voltage can be provided to the off-chip detection circuit 314 using an on-chip transimpedance amplifier to convert the photocurrent to a voltage. In this case, the same calibration circuit 120 shown in FIG. 1B can also be used to remove the calibration term representing the reflector loss and splitter asymmetry for the device circuit 300. But, in this case, the calculation accounts for the fact that the device circuit 300 includes only a single 1×2 optical splitter 312, and the calibration circuit 120 includes two 1×2 optical splitters 132A and 132B.

Figure 4:
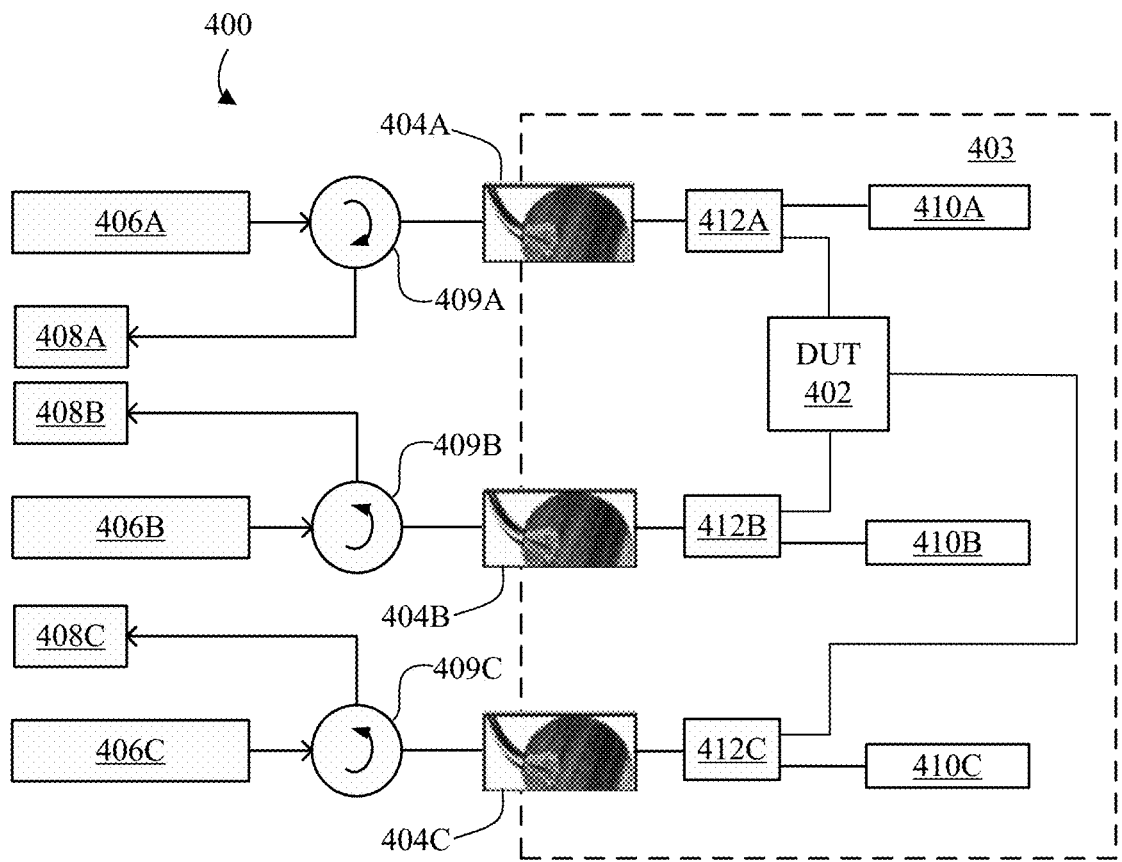
FIG. 4 is a schematic diagram of an example device circuit for a DUT with multiple output ports.

These DUT characterization techniques are also applicable to optical devices having multiple optical input ports and/or multiple output ports. FIG. 4 shows an example device circuit 400 for a 3-port DUT 402 that has an optical input port and two optical output ports, such as a 1×2 optical splitter. In this case, the on-chip testing interface used to calibrate grating couplers and the corresponding off-chip instrumentation is duplicated for each of the input and output ports of the DUT 402 for which the insertion loss is to be characterized. The DUT 402 is on a portion 403 of a chip that includes optical couplers 404A, 404B, and 404C for coupling input light from off-chip optical sources 406A, 406B, and 406C (e.g., lasers), and off-chip detectors 408A, 408B, and 408C (e.g., photodiode detection circuits) that detect reflection signals coupled back out through the respective optical couplers and off-chip optical circulators 409A, 409B, and 409C. There are also optical reflectors 410A, 410B, and 410C and multi-port optical couplers 412A, 412B, and 412C for providing those reflection signals. In this case, the same calibration circuit 120 shown in FIG. 1B can also be used to remove the calibration term representing the reflector loss and splitter asymmetry for the device circuit 400.

Figure 5:
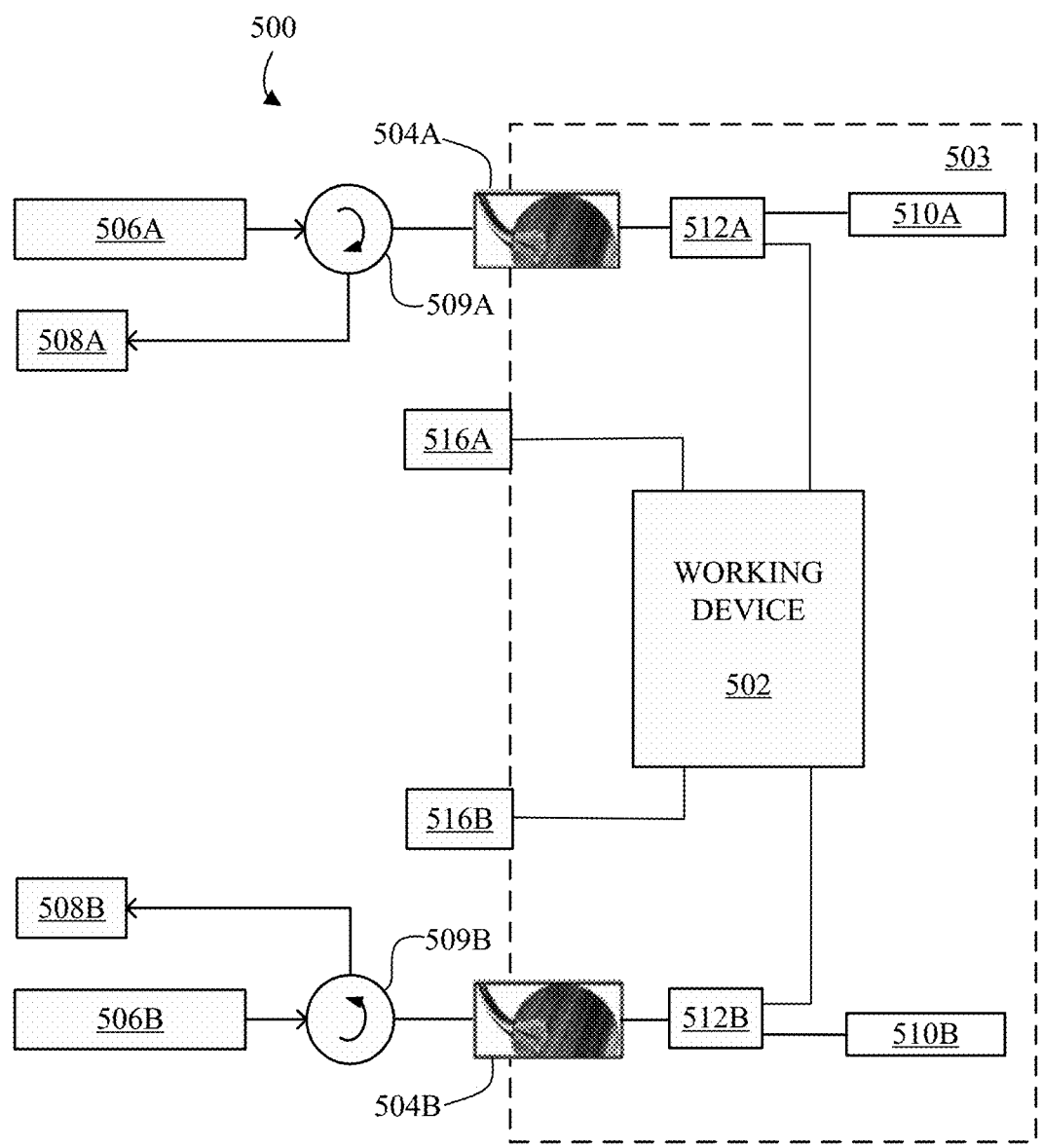
FIG. 5 is a schematic diagram of an example device circuit for a working device.

FIG. 5 shows an example of a device circuit 500 that can be used to characterize a working device 502 as the DUT. Instead of characterizing a device representing a single component as a sample of other components that are fabricated on a wafer, this example shows one way in which the DUT characterization techniques could be used for a working device that may include complex optical circuits as part of a commercial product. The working device 502 is on a portion 503 of a chip that includes optical couplers 504A and 504B for coupling input light from off-chip optical sources 506A and 506B (e.g., lasers), and off-chip detectors 508A and 508B (e.g., photodiode detection circuits) that detect reflection signals coupled back out through the respective optical couplers and off-chip optical circulators 509A and 509B. There are also optical reflectors 510A and 510B and multi-port optical couplers 512A and 512B for providing those reflection signals. In this example, the working device 502 includes a first input port and first output port that are coupled to the on-chip testing interfaces and off-chip instrumentation as before, and also includes an additional input port and an additional output port that are coupled to device interfaces 516A and 516B that provide alternative paths for sending and receiving working input and output signals, respectively. These device interfaces 516A and 516B can be part of the same portion 503 of the chip that includes the working device 502, providing an ability to validate the working device 502 as part of a commercial product, without requiring any reconfiguration between testing characterization and actual product use. The device interfaces 516A and 516B would be the user ports for connecting to the working device 502 during operation of the commercial product whereas ports 504A and 504B are used for connecting to the testing interfaces for characterization of the working device 502.

The DUT characterization techniques can also include procedures to characterize the DUT reflection, as described above, and to remove unwanted parasitic reflection coming from multi-path interferences. As SiP circuits grow in terms of number of integrated components, precise characterization of optical components can become more important. For example, precise characterization of scattering parameters as elements of a scattering matrix (also called "S-parameter characterization") of each component or sub-component may be required in some cases. Since these matrices may contain a reflection term, a precise characterization of the DUT reflection may be needed. The following are three example techniques for such characterization: an "extra port" technique, a "data processing" technique, and a "variable optical attenuator (VOA)" technique. In addition to enabling characterization of the DUT reflection, both the data processing and the VOA techniques also enable removal of unwanted parasitic reflections from the measurements.

Figure 6:
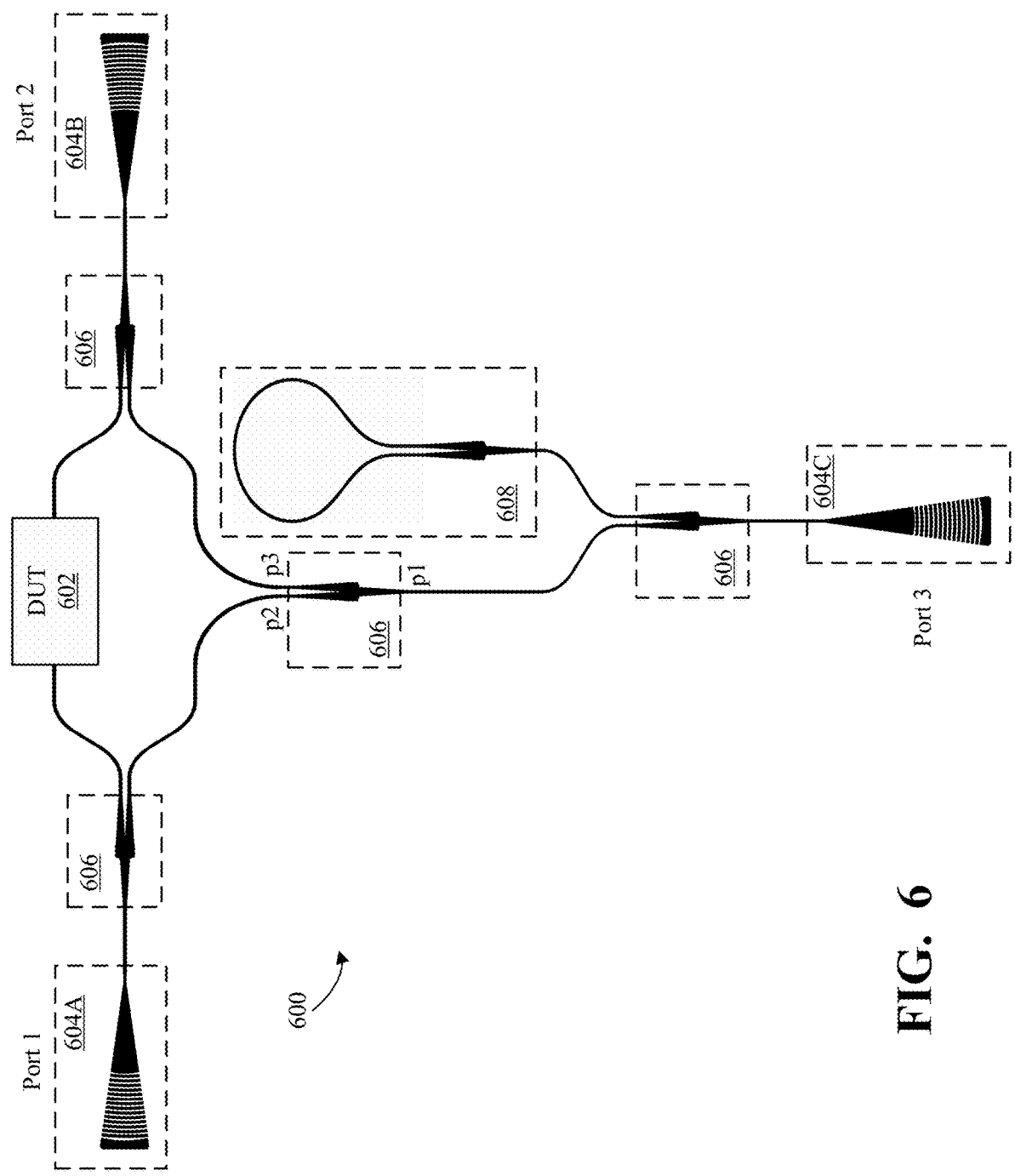
FIG. 6 is a schematic diagram of an example device circuit with an additional port.

In the extra port technique, to characterize the reflection of a DUT, a device circuit can be modified to prevent the superposition of the reflected signal from the DUT and from the Sagnac reflector (or other component causing at least a partial reflection). This superposition of optical fields would create an interference pattern that may prevent some of the data processing used to perform the characterization. To circumvent this potential issue, a different device circuit 600, as shown in FIG. 6, can use an "extra-port" technique that makes use of three optical ports for a 2-port DUT 602. In this example, there are three grating couplers 604A, 604B, and 604C coupled to Port 1, Port 2, and Port 3, respectively. There are 1×2 optical splitters 606 arranged as shown to connect a Sagnac reflector 608. Measurements using all three ports will enable characterization of the insertion loss and reflection characteristics of the DUT 602, while preventing the DUT reflection from coming out of the same port reflection from the Sagnac reflector 608.

If the higher order terms coming from multiple reflections are neglected, measurements $M_{11}$ and $M_{22}$ will provide the reflection information for the DUT 600 combined with the $GC_1$ and $GC_2$ responses, respectively. $M_{12}$ contains the insertion loss from transmission through the DUT 600 combined with the $GC_1$ and $GC_2$ responses. $M_{13}$ and $M_{23}$ contain the information for $GC_1$ and $GC_3$, and $GC_2$ and $GC_3$, respectively. Finally, $M_{33}$ contains the information for $GC_3$. Thus, $M_{33}$ can be used to find the response of $GC_3$. Then this information combined with $M_{13}$ and $M_{23}$ enables calculation of the responses for $GC_1$ and $GC_2$. As a result, $M_{11}$, $M_{22}$ and $M_{12}$ then provide the characterization information for the DUT 600. Equations similar to those given above can be used to compute the insertion loss and reflection spectral responses. Also, a calibration circuit without the DUT can be used to determine a calibration term representing the systematic errors of the circuit (e.g., splitter asymmetry and reflector losses).

Thus, for the measurement in transmission, there are four unknowns (3 GCs and 1 DUT). The four measurements used to characterize the transmission insertion loss spectral response are $M_{12}$, $M_{13}$, $M_{23}$ and $M_{33}$. After these measurements, to characterize the reflection spectral response, measurements $M_{11}$ and $M_{22}$ are sufficient since, at this point, $GC_1$ and $GC_2$ are known. To improve the performance of this extra port technique, the directivity of the 1×2 optical splitters can be a criterion used for selection, where "directivity" indicates how much of the light is going toward port p3 of element 606 when the light comes from port p2 (or similarly how much of the light is going toward port p2 when the light comes from port p3). A device with good directivity will have light from port p2 going to port p1 (and some to a loss mode) but no light going toward the other port p3, for example.

Figure 7A:
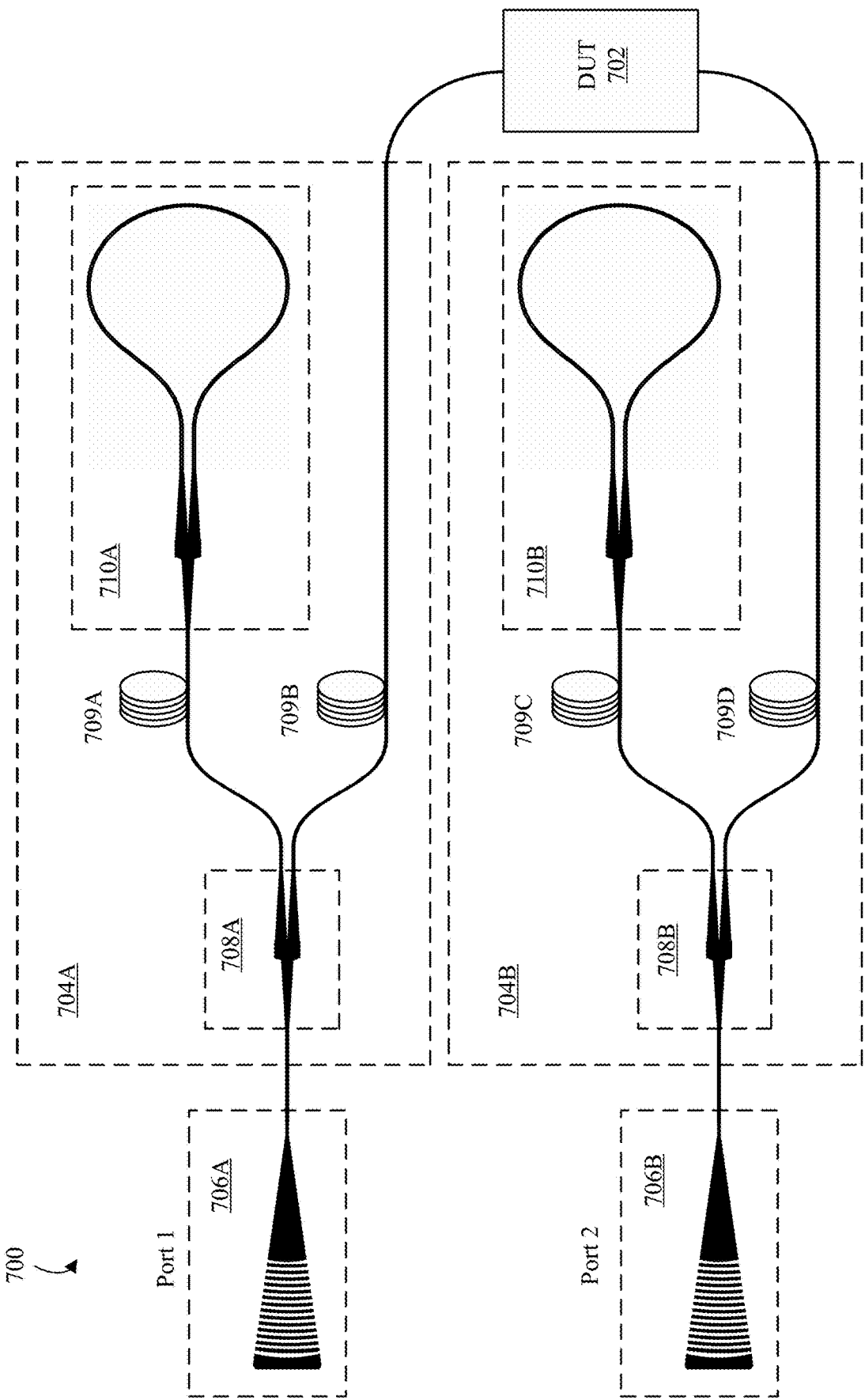
FIGS. 7A and 7B are schematic diagrams of example device circuits with delay components.
Figure 7B:
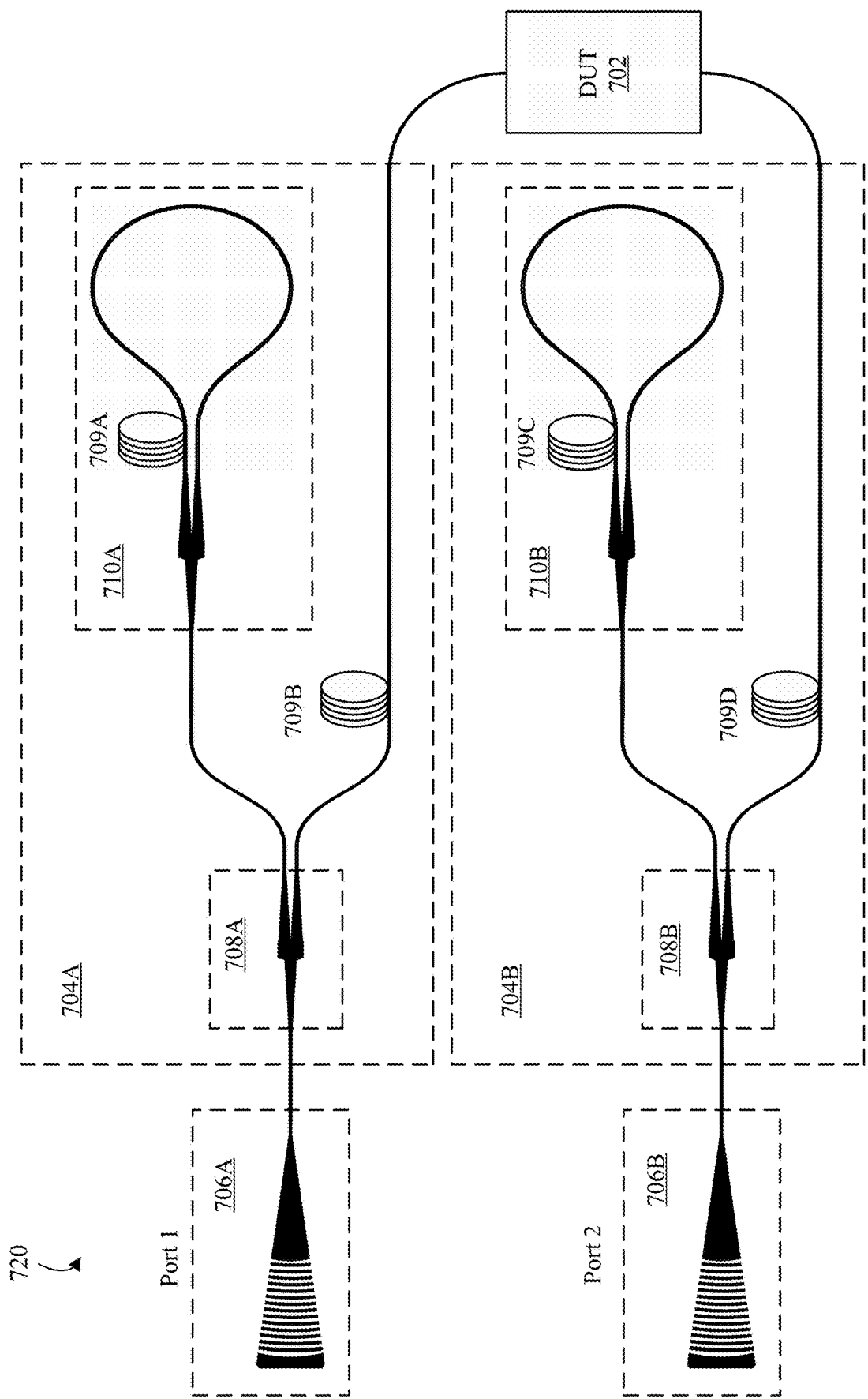

In the data processing technique, to characterize the reflection of a DUT, a device circuit can be modified to include delay components (e.g., optical delay lines) as shown in FIG. 7A or as shown in FIG. 7B. For example, an optical delay line can be implemented using a long waveguide section that is curved around a path that adds additional propagation delay, but has a large enough radius of curvature to avoid significant bend losses. FIG. 7A shows an example of a device circuit 700 for a 2-port DUT 702 that includes a testing interface 704A coupled to a grating coupler 706A for Port 1, and another testing interface 704B coupled to a grating coupler 706B for Port 2, on either side of the DUT 702. In this example, there are also delay components 709A and 709B in the testing interface 704A after the optical splitter 708A, and delay components 709C and 709D in the testing interface 704B after the optical splitter 708B. There are also Sagnac reflectors 710A and 710B within each testing interface 704A and 704B, respectively. FIG. 7B shows an alternative example of a device circuit 720 in which the circuit components are the same except for the placement of the delay component 709A within the Sagnac reflector 710A and the delay component 709C within the Sagnac reflector 710B. The reflection measurements made in these examples can be implemented by replacing the off-chip (e.g., laser, circulator, and photodetector) by a device such as an optical vector analyzer (OVA). In addition to an intensity spectral response, an OVA provides an associated phase spectral response as well. Obtaining both the intensity and phase of the measured reflection spectra $M_{ii}$ enables Fourier analysis (e.g., computation of a fast Fourier transform (FFT) of these reflection spectra), which enables a time response to be computed. Due to the different delays in the device circuit, the reflections caused by the Sagnac reflector and the DUT will arrive at two different times. Thus, time filtering can be performed on the time responses to isolate these different reflections. The reflection coming from the Sagnac reflector can be used as described herein, while the other reflection signal can be used (when calibrated by the Sagnac reflector signal) to characterize the DUT reflection. Also, by obtaining both the intensity spectral response and phase spectral response of the DUT, a complex spectral response characterizing the DUT can be computed, which can be useful for circuit simulations.

Another potential benefit of the data processing technique comes from the time filtering capability for both reflected and transmitted signals. The measurements $M_{ij}$ associated with transmission can also be obtained using the OVA. As before, higher order terms coming from multiple reflections are ignored in this example. As a result, if the grating couplers and other components in the device circuit are significantly reflective, oscillations may appear in the transmission and reflection measurements, which are artifacts of the device circuit that are not removed by measurements in the corresponding calibration circuit (without the DUT). However, by appropriate selection of the time delays provided by the delay components 709A, 709B, 709C, and 709D and/or other delay components (e.g., another delay component can be added between each grating coupler and the connected optical splitter), the multiple reflections will arrive at the OVA at different times than the signals reflected from the DUT and the Sagnac reflectors, enabling them to be filtered out using time-based filtering. For example, the difference between a time delay D1 associated with the delay components 709A and 709C and a time delay D2 associated with the delay components 709B and 709D can be a few picoseconds.

Figure 8:
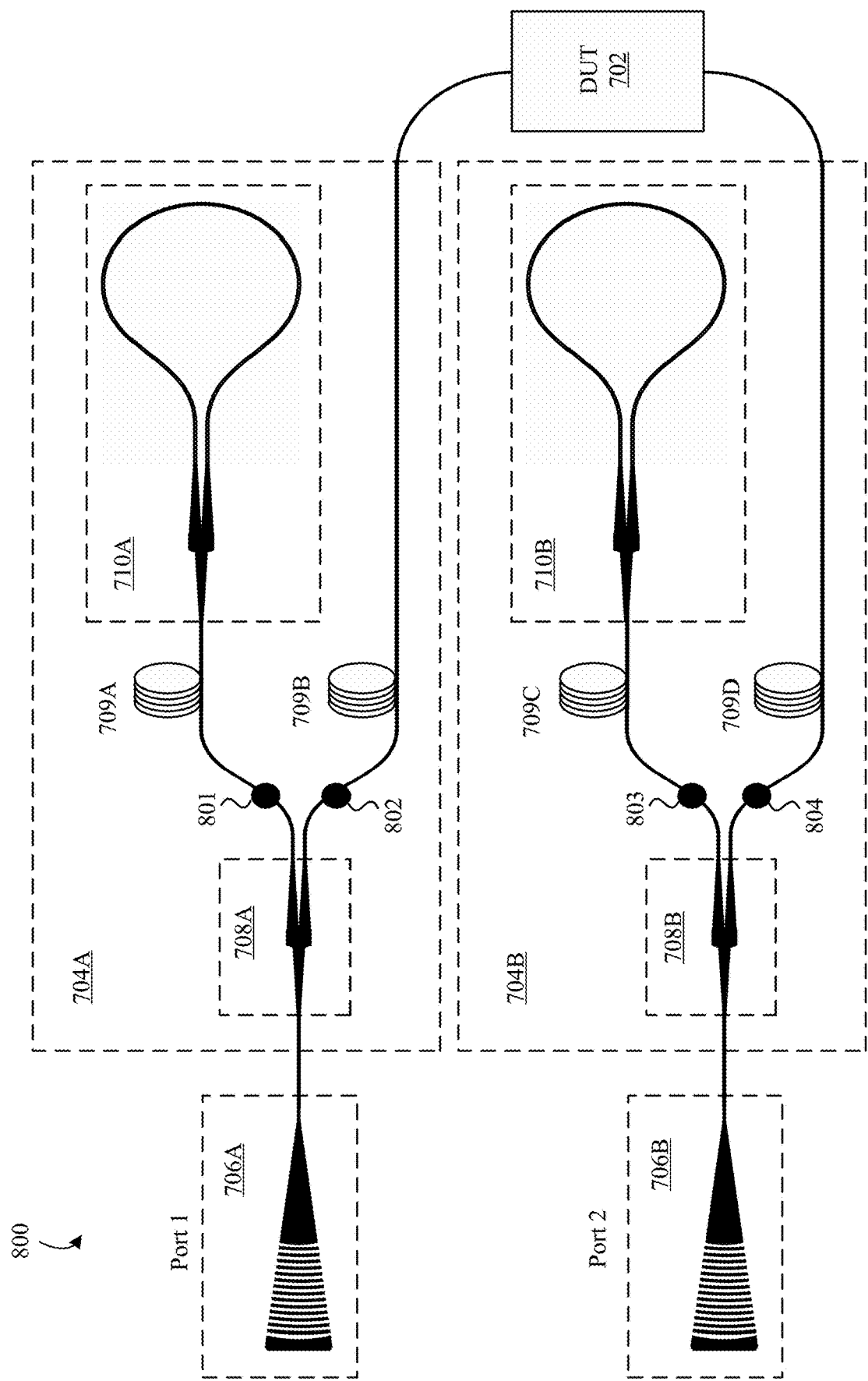
FIG. 8 is a schematic diagram of an example device circuit with variable optical attenuators and delay components.
Figure 9:
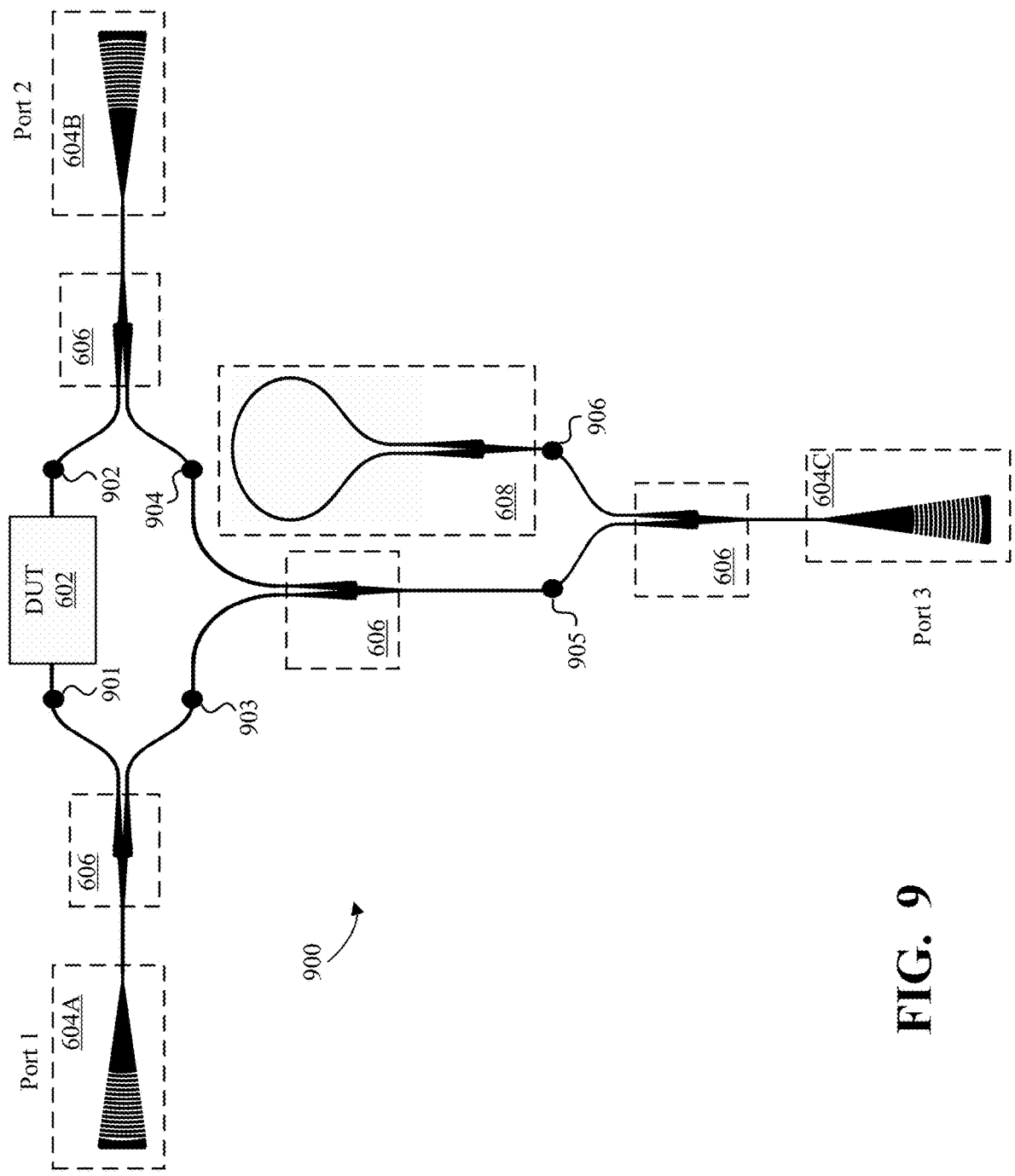
FIG. 9 is a schematic diagram of an example device circuit with variable optical attenuators and an additional port.

In the VOA technique, instead of using an OVA to obtain the complex spectral response for the different measurements, and performing Fourier analysis to retrieve the DUT reflection, variable optical attenuators (VOAs) can be included in the device circuit to attenuate or completely block signals going into some parts of the device circuit. For example, FIG. 8 shows a device circuit 800 similar to the device circuit 700 of FIG. 7A but including VOA 801, VOA 802, VOA 803, and VOA 804, and FIG. 9 shows a device circuit 900 similar to the device circuit 600 of FIG. 6 but including VOA 901, VOA 902, VOA 903, VOA 904, VOA 905, and VOA 906. In some implementations, these VOAs are operated in one of two modes: all-pass mode in which there is essentially no attenuation applied, or a blocking mode in which significant attenuation is applied to block essentially all optical power from passing. In the following, a notation is used where the x in $M^x_{yz}$ indicates which VOA is in a in a blocking mode, y indicates the output port and z indicates the input port. Referring to FIG. 8, for the $M_{11}$ measurement, if the VOA 802 is in the blocking mode (yielding measurement $M^2_{11}$), the response will not contain information coming from the DUT 702 whereas if the VOA 801 is in the blocking mode (yielding measurement $M^1_{11}$), the measurement will not contain information from the Sagnac reflector 710A. So, $M^1_{11}$ and $M^2_{11}$ can be used to characterize both the grating couplers 706A and 706B and the reflection of the DUT 702 independently. For the $M_{12}$ measurement, the VOA 801 and the VOA 803 can also be set in blocking mode to prevent MPI that could result from an imperfect splitter directivity.

Similarly, FIG. 9 shows an example in which similar measurements can be made for the "extra-port" technique. The six VOAs 901, 902, 903, 904, 905, and 906 are used to remove the grating coupler response from the optical measurement of a reflective DUT 602 while preventing the reflection from the DUT 602 from coming out of the same port as a signal reflected from the Sagnac reflector 608. Generally, the VOAs prevent MPI coming from other components.

In other examples, various alternatives of the VOA technique can include replacing VOAs with other components. For example, instead of using VOAs to block access to certain paths of a circuit, the splitter/VOA functionality in these examples could be replicated by using a tunable splitter.

Figure 10:
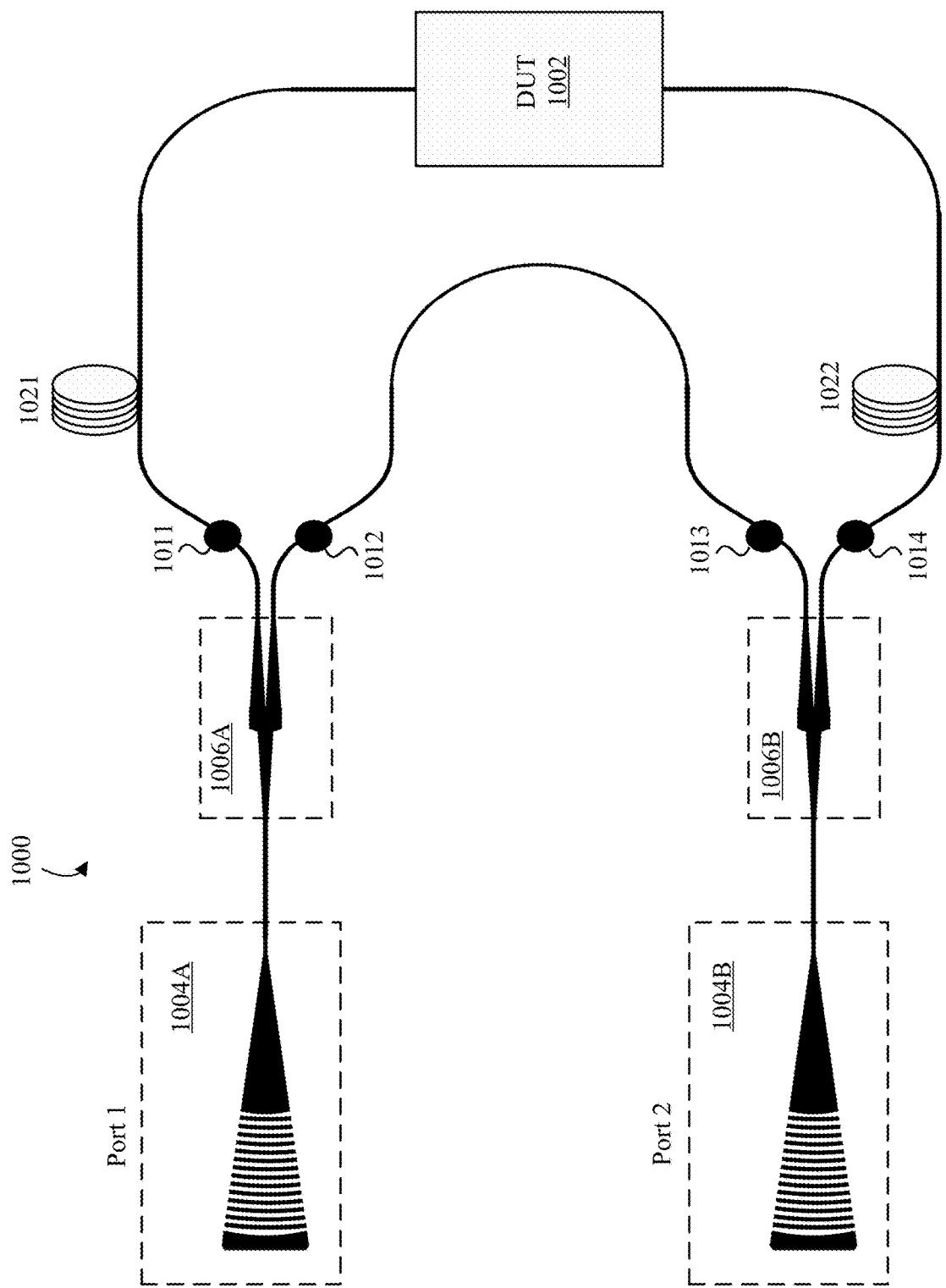
FIG. 10 is a schematic diagram of an example device circuit in an alternative arrangement.

In an alternative DUT characterization technique, if only the transmission of the DUT needs to be characterized, the optical couplers before and after the DUT do not have to be characterized independently but can instead be characterized together and measured as one unknown parameter. For example, if VOAs and/or delay elements are included in the device circuit, the summation of the insertion losses of the two optical couplers can be identified together. In this example, no Sagnac reflectors are needed in the device circuit. FIG. 10 shows an example of this alternative technique, where a device circuit 1000 includes a DUT 1002, a grating coupler 1004A for Port 1 connected to an optical splitter 1006A, and a grating coupler 1004B for Port 2 connected to an optical splitter 1006B. In one path of the device circuit 1000 is the DUT 1002 with different delay components 1021 and 1022 on either side of the DUT 1002. The device circuit 1000 also includes a second path in which the optical splitter 1006A and the optical splitter 1006B are connected directly by a waveguide. There are also four VOAs, with VOA 1011, VOA 1012, VOA 1013, and VOA 1014 each controlling transfer of optical power between a port of one of the optical splitters and a path of the device circuit 1000.

The measurements $M^1_{12}$ and $M^2_{12}$ (where, again, the x in $M^x_{yz}$ indicates which VOA is in a in a blocking mode, y indicates the output port and z indicates the input port) are sufficient for characterizing the DUT 1002. In this case, neglecting the terms coming from multiple reflections yields:

$$M^1_{12}[dB] = GC_1 + T_a^{1\times 2} + (S_a^{1\times 2})' + T_b^{1\times 2} + (S_b^{1\times 2})' + GC_2$$
$$= GC_1 + GC_2 + T_a^{1\times 2} + T_b^{1\times 2} + (S_a^{1\times 2})' + (S_b^{1\times 2})'$$

$$M^2_{12}[dB] = GC_1 + T_a^{1\times 2} + S_a^{1\times 2} + DUT + T_b^{1\times 2} + S_b^{1\times 2} + GC_2$$
$$= GC_1 + GC_2 + T_a^{1\times 2} + T_b^{1\times 2} + S_a^{1\times 2} + S_b^{1\times 2} + DUT$$

So, subtracting these two equations gives:

$$M^2_{12} - M^1_{12} = GC_1 + GC_2 + T_a^{1\times 2} + T_b^{1\times 2} + S_a^{1\times 2} +$$
$$S_b^{1\times 2} + DUT - (GC_1 + GC_2 + T_a^{1\times 2} + T_b^{1\times 2} + (S_a^{1\times 2})' + (S_b^{1\times 2})')$$

After regrouping the terms, we have:

$$M^2_{12} - M^1_{12} = DUT + \underbrace{(S_a^{1\times 2} - (S_a^{1\times 2})') + (S_b^{1\times 2} - (S_b^{1\times 2})')}_{1\times 2\,Splitter\ asymmetry}$$

This alternative DUT characterization technique can be used with a device circuit without a corresponding calibration circuit if the optical splitters have a low asymmetry. Or, a calibration circuit can be used to characterize the systematic optical splitter asymmetry. So, the resulting uncertainty in the measurements to characterize the DUT depends on the variability of the optical splitters but not on the asymmetry.

In an example of a time filtering approach, if the VOAs are removed, and instead delay components are used to make sure that both measurements ($M^1_{12}$ and $M^2_{12}$) arrive the output port at two different times, an OVA can be used to characterize the transmission using time filtering applied to the signals (e.g., using processing techniques as described herein). A potential benefit of this time filtering approach is the ability to avoid the electrical contacts that would otherwise be used for the VOAs, at the expense of performing more complex processing and potentially more expensive off-chip equipment (e.g., one or more lasers and one or more photodetectors may be less expensive than an OVA system).

Figure 11:
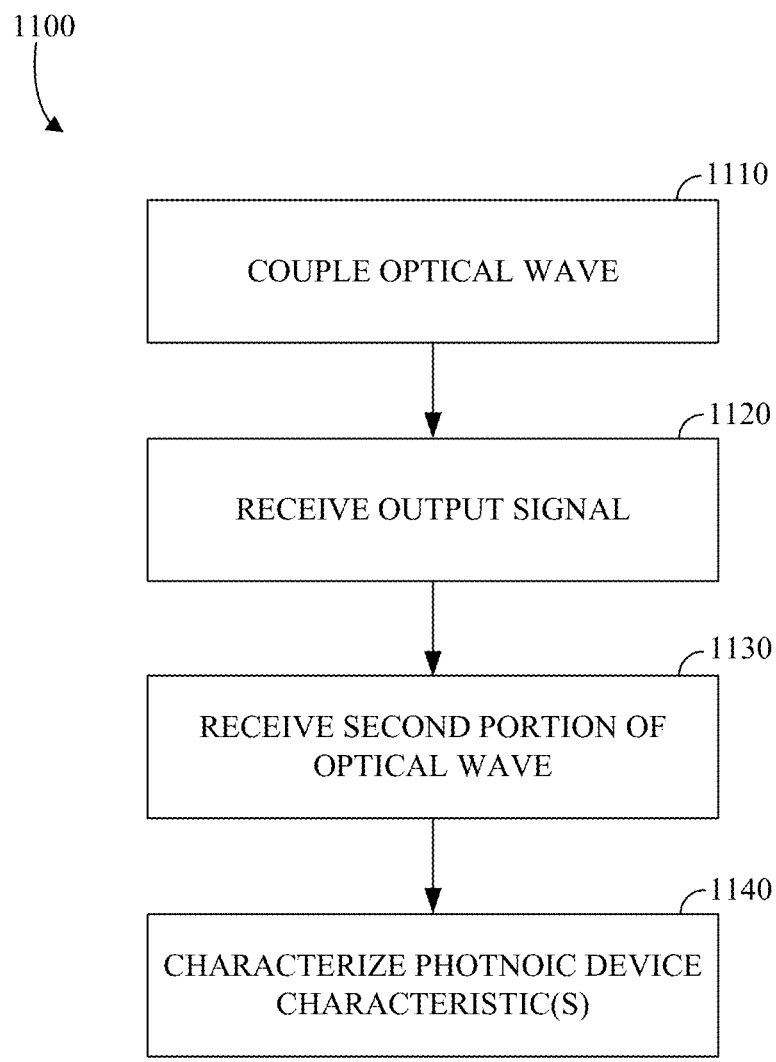
FIG. 11 is a flowchart of an example characterization method.

FIG. 11 shows a flowchart of an example method 1100 for characterizing a photonic device (DUT) in a photonic layer of an integrated circuit. The method 1100 includes coupling (1110) an optical wave into a first optical coupler in the photonic layer. The method 1100 includes receiving (1120) an output signal from the photonic device in response to the photonic device receiving a first portion of the optical wave. The method 1100 includes receiving (1130) a second portion of the optical wave from the first optical coupler, where the second portion of the optical wave was not coupled into the photonic device. The receiving the output signal (e.g., an optical output signal or an electronic output signal) and the receiving of the second portion of the optical wave (e.g., reflected and coupled back out of the first optical coupler) can be done concurrently, or in any order. The method 1100 also includes characterizing (1140) at least one of an optical transmission characteristic or an optical reflection characteristic of the photonic device based at least in part on the received second portion of the optical wave and the received output signal.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for characterizing a photonic device that includes one or more ports in a photonic layer of an integrated circuit, the method comprising:
   coupling an optical wave into a first optical coupler that couples at least a first optical mode outside of the photonic layer to a first waveguide in the photonic layer;
   wherein the integrated circuit comprises
   a first multi-port optical coupler that includes three or more ports in the photonic layer, including
   a first port optically coupled to the first optical coupler,
   a second port optically coupled to a first port of the photonic device, and a third port optically coupled to a first optical reflector configured to send substantially all optical power emitted from the third port of the first multi-port optical coupler back to the third port of the first multi-port optical coupler;

a second optical coupler that couples at least a second optical mode outside of the photonic layer to a second waveguide in the photonic layer; and a second multi-port optical coupler that includes three or more ports in the photonic layer, including
a first port optically coupled to the second optical coupler,
a second port optically coupled to a second port of the photonic device, and
a third port optically coupled to a second optical reflector configured to send substantially all optical power emitted from the third port of the second multi-port optical coupler back to the third port of the second multi-port optical coupler; and wherein the method further comprises
providing an output signal from the photonic device in response to the photonic device receiving a first portion of the optical wave;
providing a second portion of the optical wave from the first optical coupler, wherein the second portion of the optical wave was not coupled into the photonic device; and
characterizing at least one of an optical transmission characteristic or an optical reflection characteristic of the photonic device based at least in part on the second portion of the optical wave and the output signal.

2. The integrated circuit of claim 1, wherein the photonic device includes the first port, the second port, a third port that provides an alternative path for input received at the first port, and a fourth port that provides an alternative path for output emitted from the second port.

3. The integrated circuit of claim 1, further comprising
a third optical coupler that couples a third optical mode outside of the photonic layer to a third waveguide in the photonic layer; and
a third multi-port optical coupler that includes three or more ports in the photonic layer, including
a first port optically coupled to the third optical coupler,
a second port optically coupled to a third port of the photonic device, and
a third port optically coupled to a third optical reflector configured to send substantially all optical power emitted from the third port of the third multi-port optical coupler back to the third port of the third multi-port optical coupler.

4. The integrated circuit of claim 1, wherein the photonic device comprises an electro-optical component that includes at least one optical input or output port and at least one electrical input or output port.

5. The integrated circuit of claim 1, wherein the first optical coupler comprises a grating coupler or an edge coupler.

6. The integrated circuit of claim 1, wherein the photonic layer includes one or more optical delay lines configured to provide different propagation delays: (1) between the first multi-port optical coupler and the first optical reflector, and (2) between the first multi-port optical coupler and the photonic device.

7. The integrated circuit of claim 1, wherein the first optical reflector comprises a Sagnac loop reflector.

8. The integrated circuit of claim 1, wherein the photonic layer includes one or more variable optical attenuators configured to provide control of optical power propagating within different portions of the photonic layer.

9. The integrated circuit of claim 1, further comprising
the second optical coupler that couples the second optical mode outside of the photonic layer to a second waveguide in the photonic layer that is optically coupled to the first port of the photonic device and optically coupled to the second port of the first multi-port optical coupler; and
a third optical coupler that couples a third optical mode outside of the photonic layer to a third waveguide in the photonic layer that is optically coupled to the second port of the photonic device and optically coupled to the second port of the first multi-port optical coupler;
wherein the second port of the first multi-port optical coupler is optically coupled to the first port of the photonic device by receiving a portion of an optical wave that is received by the second optical coupler and at least partially transmitted to the first port of the photonic device.

10. A method for characterizing a photonic device in a photonic layer of an integrated circuit, comprising:
coupling an optical wave into a first optical coupler in the photonic layer;
providing an output signal from the photonic device in response to the photonic device receiving a first portion of the optical wave;
providing a second portion of the optical wave from the first optical coupler, wherein the second portion of the optical wave was not coupled into the photonic device; and
characterizing at least one of an optical transmission characteristic or an optical reflection characteristic of the photonic device based at least in part on the second portion of the optical wave and the output signal.

11. The method of claim 10, wherein the output signal comprises at least one of an optical wave, a current, or a voltage.

12. The method of claim 10, wherein the characterizing includes performing time filtering to distinguish the second portion of the optical wave and the output signal based at least in part on one or more optical delay lines in the photonic layer.

13. The method of claim 10, wherein at least one of providing the output signal or providing the second portion of the optical wave is performed while attenuating at least one optical wave in a waveguide in the photonic layer.

14. The method of claim 10, wherein the characterizing includes subtracting a value based on the second portion of the optical wave from a value based on the output signal.

15. The method of claim 10, wherein the output signal from the photonic device comprises an optical wave from the photonic device, and the characterizing is based at least in part on a first output optical wave coupled out of a second optical coupler in the photonic layer in a first time period including a portion of the optical wave from the photonic device, and a second output optical wave coupled out of the second optical coupler in a second time period including a portion of the second portion of the optical wave.

16. An integrated circuit, comprising:
at least one photonic layer that includes one or more optical waveguides;
a first grating coupler that couples at least a first optical mode outside of the photonic layer to a first waveguide in the photonic layer;
a photonic device that includes one or more ports in the photonic layer;

a first optical splitter that includes three or more ports in the photonic layer, including
- a first port optically coupled to the first grating coupler,
- a second port optically coupled to a first port of the photonic device, and
- a third port optically coupled to a first Sagnac loop reflector;

a second grating coupler that couples at least a second optical mode outside of the photonic layer to a second waveguide in the photonic layer;

a third grating coupler that couples a third optical mode outside of the photonic layer to a third waveguide in the photonic layer;

a second optical splitter that includes three or more ports in the photonic layer, including
- a first port optically coupled to the second grating coupler,
- a second port isolated from the photonic device, and
- a third port optically coupled to a second Sagnac loop reflector; and a third optical splitter that includes three or more ports in the photonic layer, including
- a first port optically coupled to the third grating coupler,
- a second port optically isolated from the photonic device and coupled to the second port of the second optical splitter, and
- a third port optically coupled to a third Sagnac loop reflector.

\* \* \* \* \*